United States Patent
Akiyama

(10) Patent No.: US 9,261,716 B2
(45) Date of Patent: Feb. 16, 2016

(54) OPTICAL SEMICONDUCTOR DEVICE AND OPTICAL SEMICONDUCTOR DEVICE CONTROL METHOD

(71) Applicant: FUJITSU LIMITED, Kawasaki-shi, Kanagawa (JP)

(72) Inventor: Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/482,337

(22) Filed: Sep. 10, 2014

(65) Prior Publication Data
US 2014/0376851 A1 Dec. 25, 2014

Related U.S. Application Data

(63) Continuation of application No. PCT/JP2012/058445, filed on Mar. 29, 2012.

(51) Int. Cl.
G02B 6/12 (2006.01)
G02F 1/025 (2006.01)
G02F 1/01 (2006.01)

(52) U.S. Cl.
CPC .............. *G02F 1/025* (2013.01); *G02F 1/0147* (2013.01); *G02F 2201/58* (2013.01); *G02F 2203/60* (2013.01)

(58) Field of Classification Search
CPC ................................ G02B 6/12; G02B 6/122
USPC .............................................................. 385/2
See application file for complete search history.

(56) References Cited

U.S. PATENT DOCUMENTS

| 7,664,156 B2 * | 2/2010 | Yamazaki ........................ 372/94 |
| 7,667,200 B1 * | 2/2010 | Watts et al. ................. 250/338.1 |
| 7,941,014 B1 * | 5/2011 | Watts et al. ...................... 385/32 |
| 2003/0235367 A1 * | 12/2003 | Yamazaki ........................ 385/39 |
| 2006/0222038 A1 * | 10/2006 | Yamazaki ........................ 372/94 |
| 2006/0222039 A1 * | 10/2006 | Yamazaki ........................ 372/94 |
| 2007/0230856 A1 * | 10/2007 | Yamazaki ........................... 385/5 |
| 2009/0122817 A1 * | 5/2009 | Sato et al. ........................ 372/20 |
| 2009/0169149 A1 * | 7/2009 | Block ................................ 385/9 |
| 2009/0285251 A1 * | 11/2009 | Yamazaki ........................ 372/34 |
| 2011/0013654 A1 * | 1/2011 | Yamazaki ................... 372/29.02 |
| 2015/0049982 A1 * | 2/2015 | Qi et al. ........................... 385/14 |

FOREIGN PATENT DOCUMENTS

| JP | 04-096386 | 3/1992 |
| JP | 08-195720 | 7/1996 |

OTHER PUBLICATIONS

International Search Report, mailed in connection with PCT/JP2012/058445 and mailed Apr. 24, 2012.

* cited by examiner

*Primary Examiner* — Kaveh C Kianni
(74) *Attorney, Agent, or Firm* — Fujitsu Patent Center

(57) ABSTRACT

An optical semiconductor device includes a ring waveguide, and a serpentine waveguide configured to be optically connected to the ring waveguide and surround at least a part of the ring waveguide in a serpentine form. In the optical semiconductor device, the serpentine waveguide heats the ring waveguide by absorbing input light propagated from the ring waveguide to the serpentine waveguide.

12 Claims, 24 Drawing Sheets

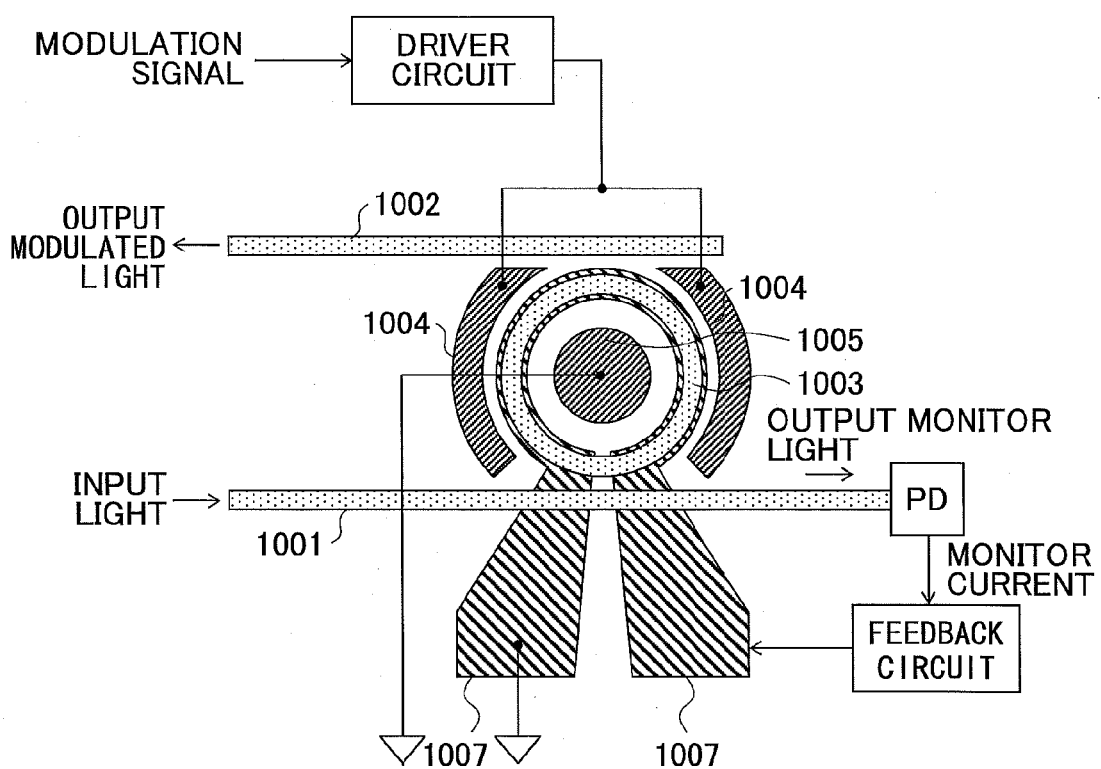

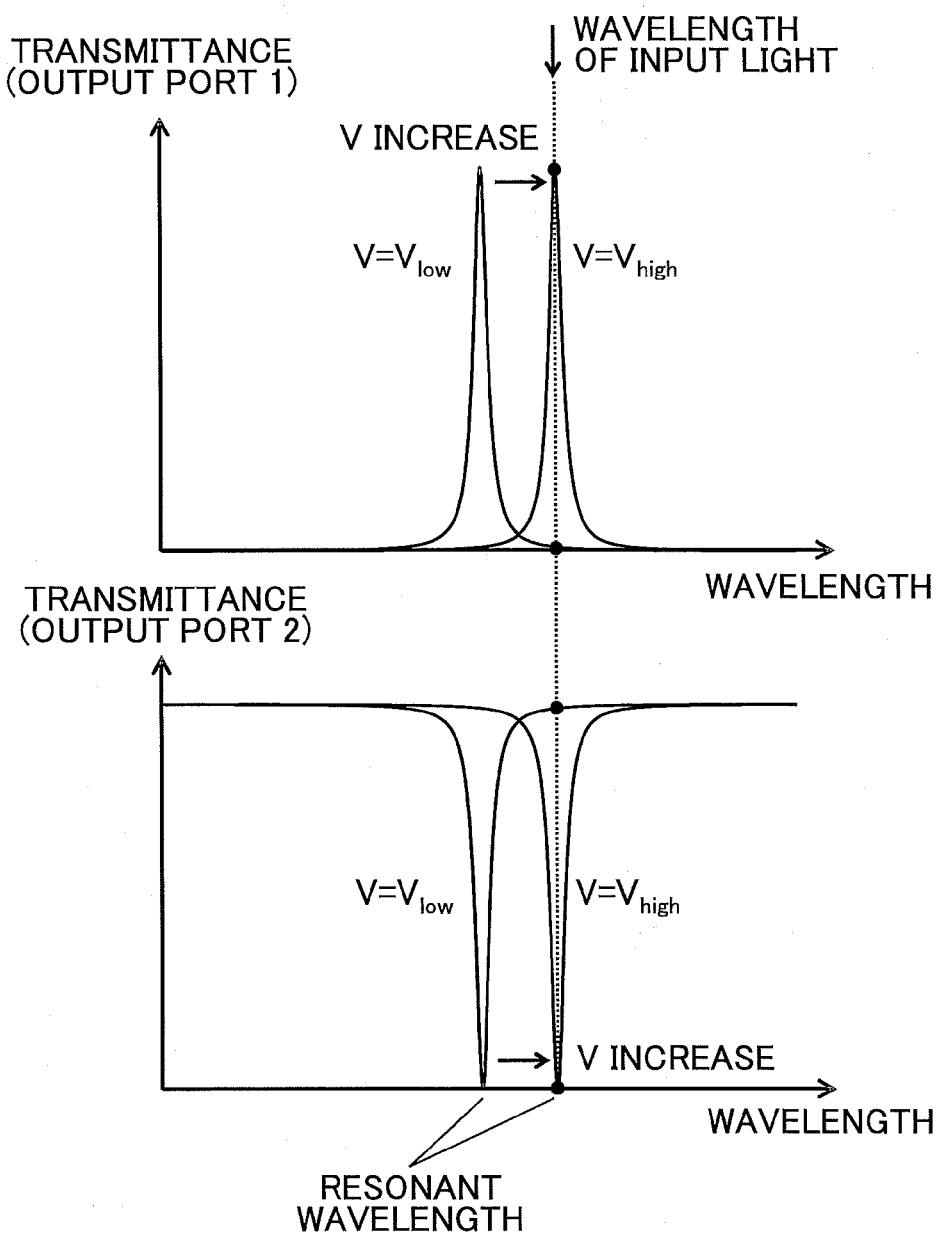

FIG.3B
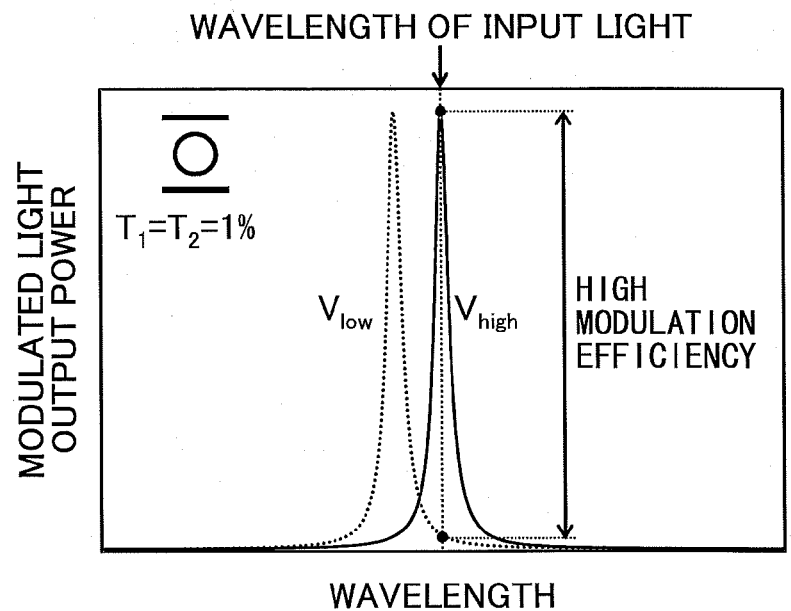
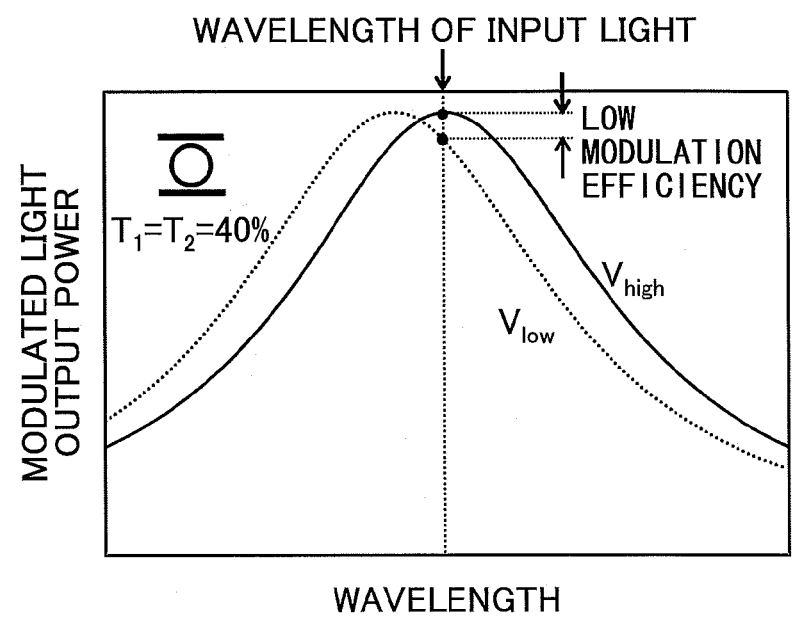

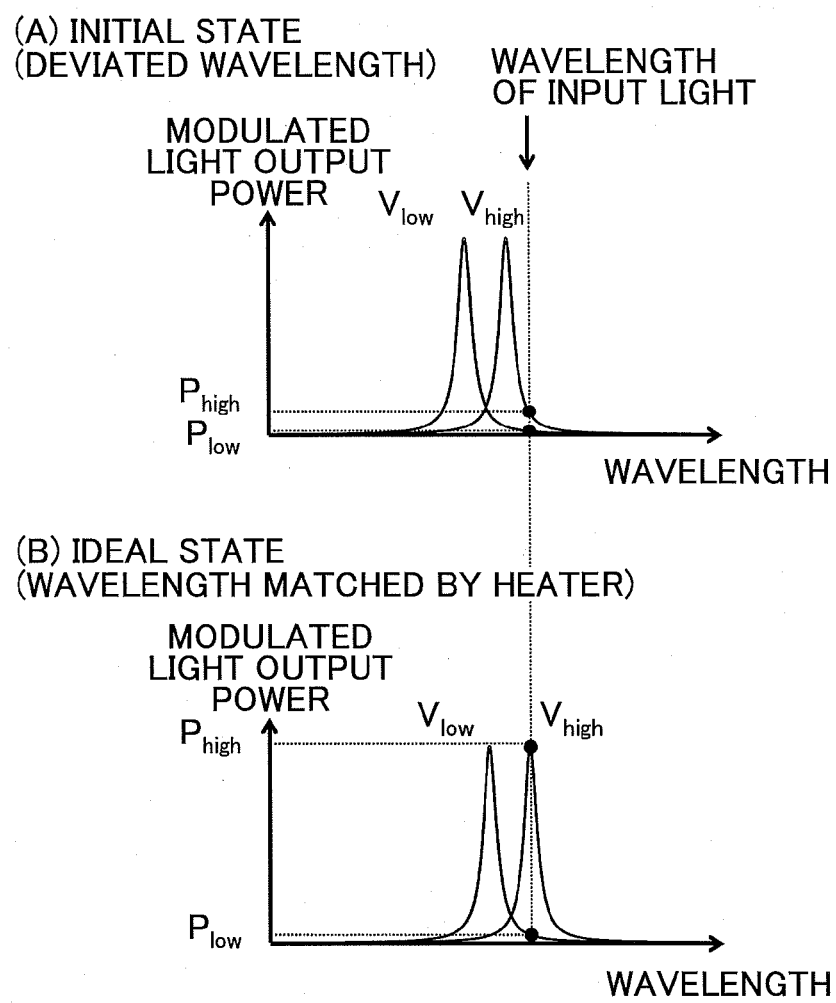

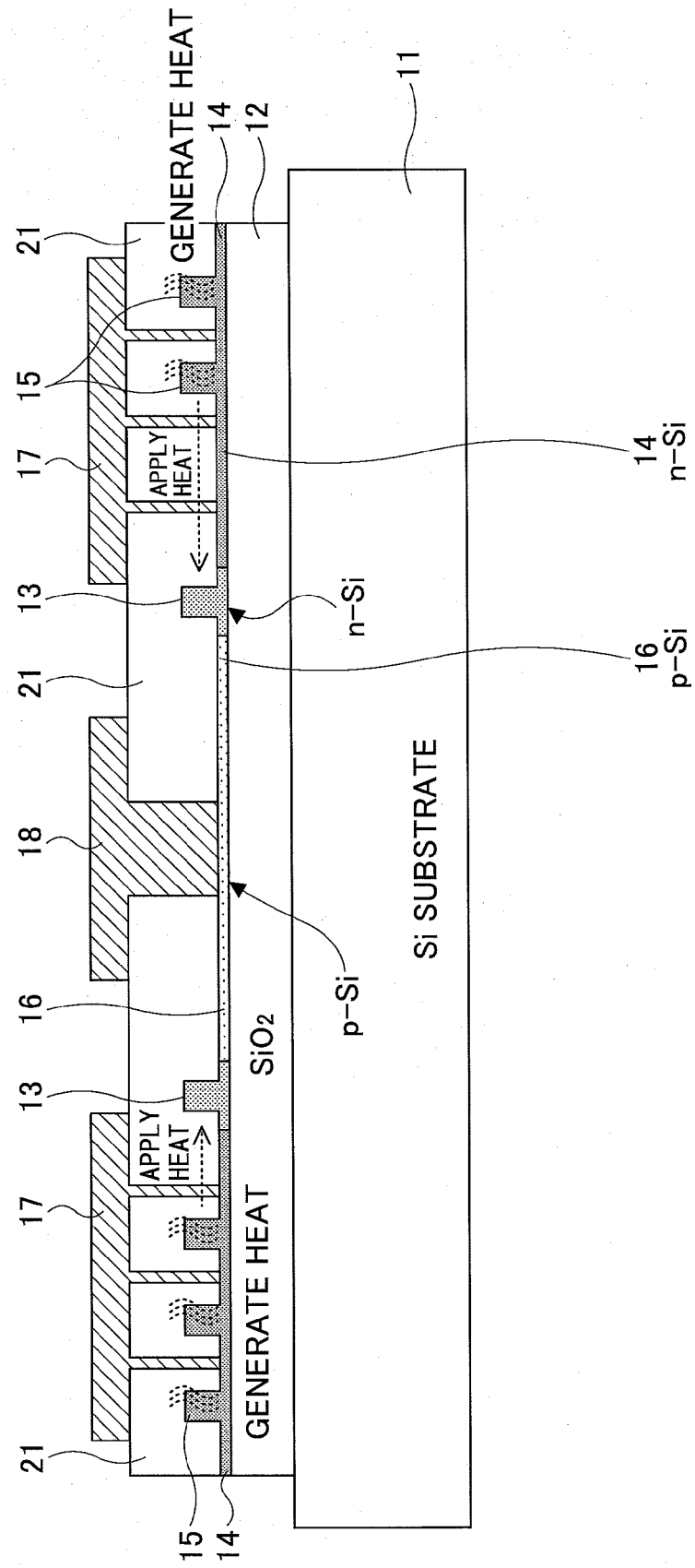

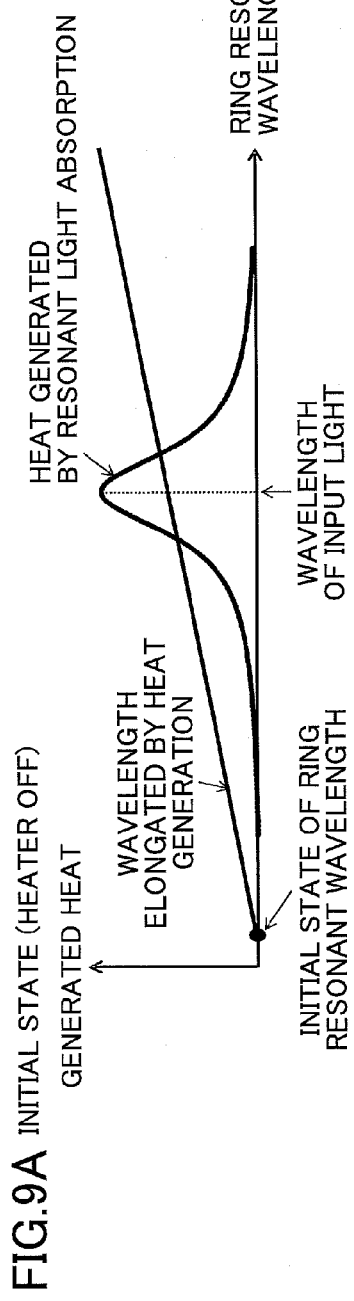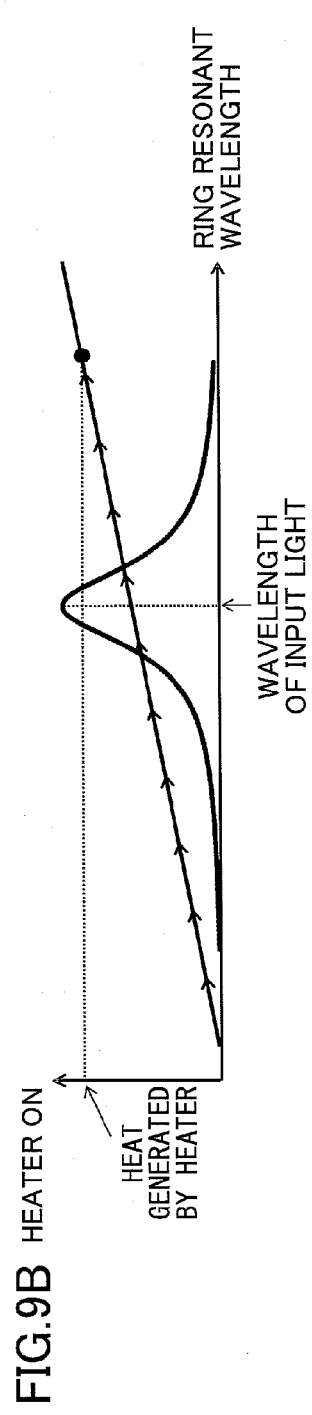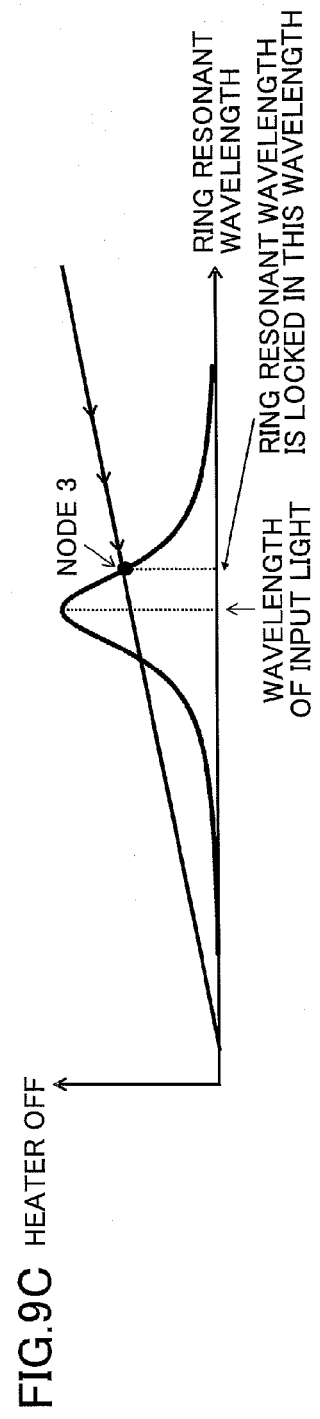

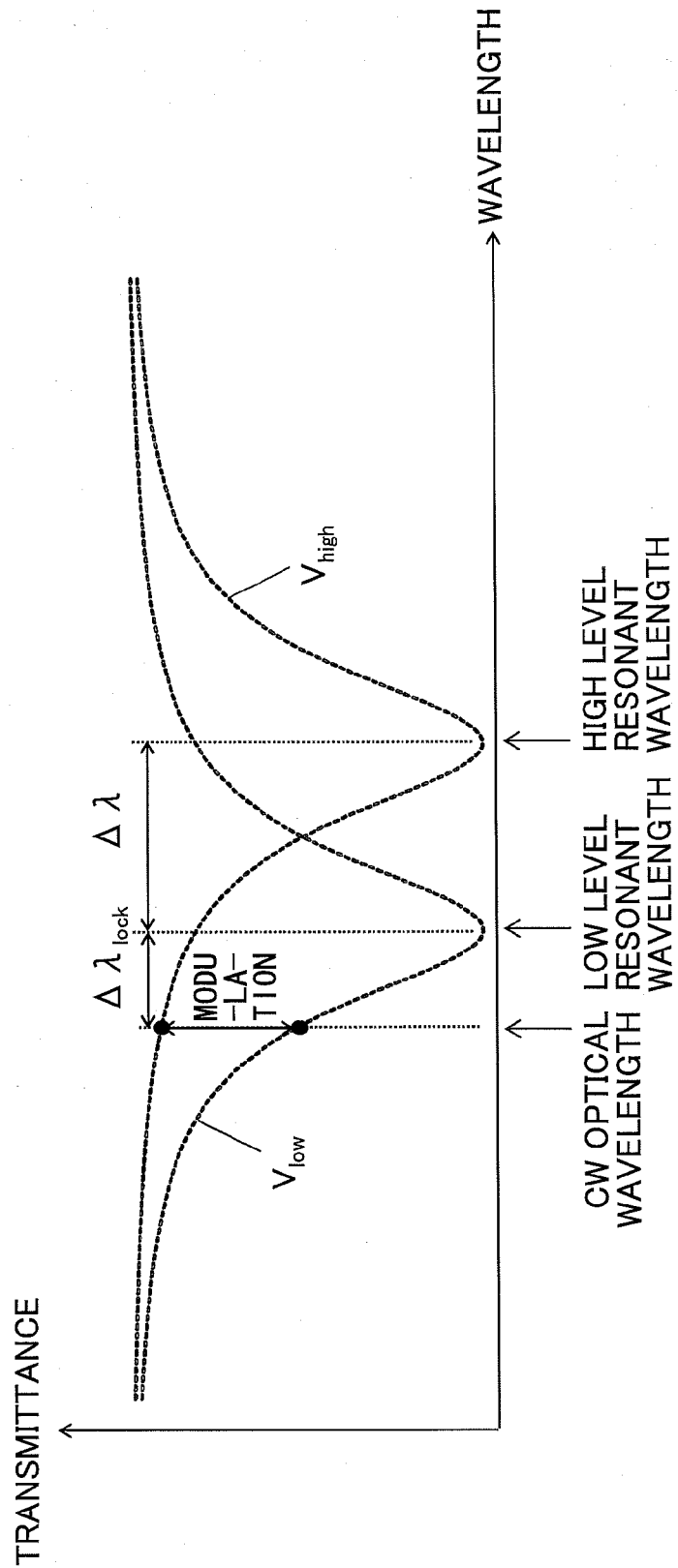

(1) CONTROL FLOW (2) CONTROL FLOW

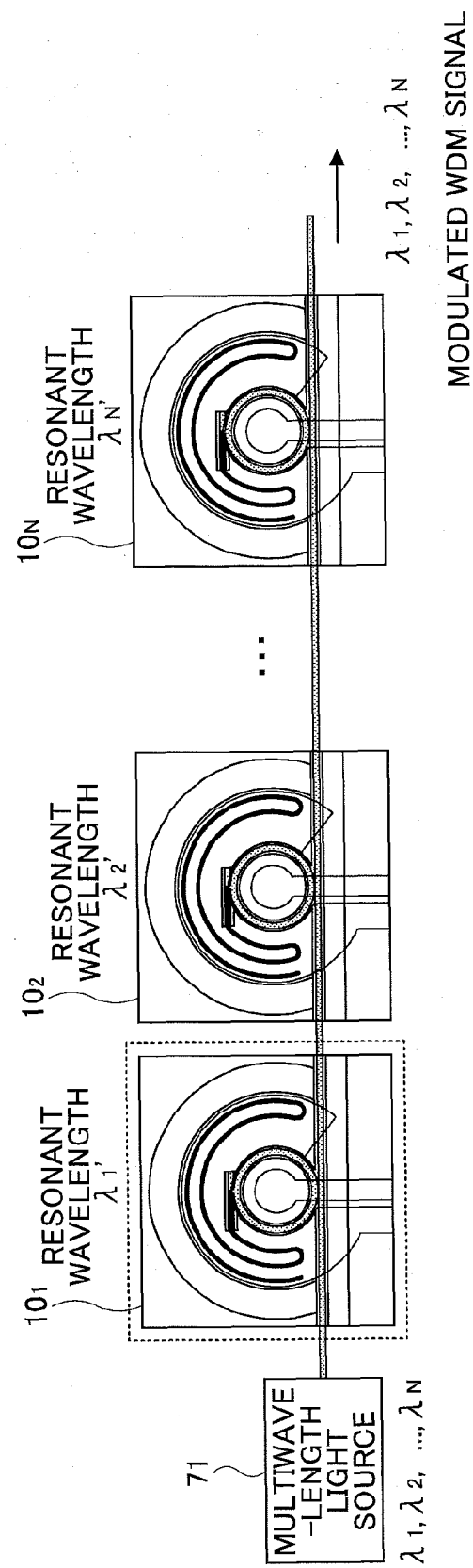

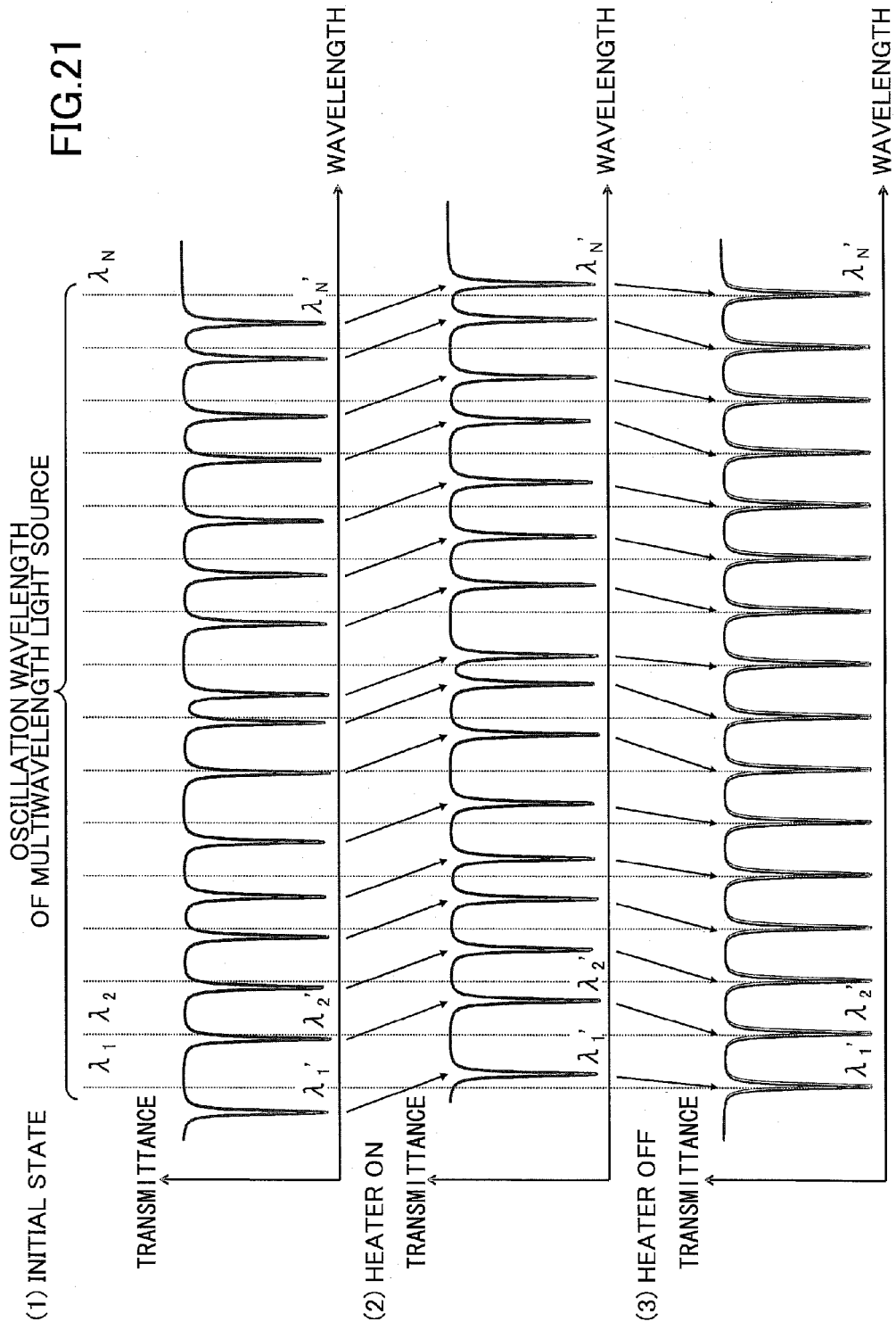

OPTICAL SEMICONDUCTOR DEVICE AND OPTICAL SEMICONDUCTOR DEVICE CONTROL METHOD

CROSS-REFERENCE TO RELATED APPLICATIONS

This application is a continuation application of International Application PCT/JP2012/058445 filed on Mar. 29, 2012 and designates the U.S., the entire contents of which are incorporated herein by reference.

FIELD

The embodiments discussed herein relate to an optical semiconductor device and an optical semiconductor device control method.

BACKGROUND

Mounting an optical device on silicon may be one of the important factors in reducing the size and power consumption of optical transceiver having a large capacity. Since an optical device on silicon is capable of employing an optical waveguide with a large relative refractive index difference, it may be more advantageous to use the optical device on silicon than to use other materials in the reduction in size of an optical transceiver. Further, since the optical device on silicon is easily integrated with an electronic circuit, it may be possible to integrate a large number of optical transceivers into one chip.

In particular, a modulator has, among other optical devices, properties that greatly affect power consumption and size of an optical transceiver. Specifically, a ring modulator itself is small, uses a small modulation voltage, and has a small optical loss, it is advantageous to use the ring modulator for the reduction in size and power consumption of an optical transceiver. However, a wavelength band of the ring modulator may be narrow.

For example, US Patent Publication No. 2009/0169149 (Patent Document 1) discloses a technology to match a wavelength of light input to a ring resonator and a resonant wavelength. In this technology, output of monitor light is detected, and a heater is controlled based on a monitor current. The monitor current is fed back to the heater to adjust a temperature of the ring resonator, and the resonant wavelength is shifted so as to be consistent with the wavelength of the input light.

FIG. 1 is a schematic diagram of a monitor current feedback ring modulator. Modulation signals supplied via a driver circuit to modulation electrodes 1004 and 1005 change a resonant wavelength of a ring resonator 1003. Light input to a waveguide 1001 is output to a waveguide 1002 if the light resonates with the ring resonator 1003. Light input to a waveguide 1001 is supplied as monitor light to a photodetector (PD) if the light does not resonate with the ring resonator 1003. The monitor current output from the photodetector is supplied to a heater 1007 via a feedback circuit. The heater 1007 is controlled such that the monitor current becomes minimum.

When modulation efficiency is attempted to be increased by using the ring modulator, the transmittance close to the resonant wavelength may dramatically change with respect to the wavelength of input light. As a result, slight shift of the wavelength from the resonant wavelength may lead to an area exhibiting no transmittance change. The same applies to the monitor current. When the wavelength of the input light slightly separates from the resonant wavelength, a change in the monitor current due to the wavelength change cannot be detected, which makes it difficult to perform wavelength control using the heater. That is, it may be difficult to simultaneously achieve improvement of the efficiency of the modulation by enhancing the resonance and wide-range wavelengths.

RELATED ART DOCUMENT

Patent Document 1: US Patent Publication No. 2009/0169149

SUMMARY

According to an aspect of an embodiment, there is provided an optical semiconductor device that includes a ring waveguide; and a serpentine waveguide configured to be optically connected to the ring waveguide and surround at least a part of the ring waveguide in a serpentine form. In the optical semiconductor device, the serpentine waveguide heats the ring waveguide by absorbing input light propagated from the ring waveguide to the serpentine waveguide.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 1 is a related art configuration of a ring modulator to control a resonant wavelength;

FIG. 2B is a diagram illustrating properties of a ring modulator;

FIG. 3B is a diagram illustrating a relationship between broadness of a band and modulation efficiency;

FIG. 4 is a diagram illustrating adjustments of a resonant wavelength utilizing a heater;

FIG. 6 is an enlarged cross-sectional diagram illustrating the ring modulator of FIG. 5;

FIGS. 9A to 9C are diagrams illustrating respective stabilized points of the ring resonant wavelength after the heater is switched off;

FIG. 10 is a transmission spectrum of the ring modulator during modulation;

FIG. 20 is a configuration diagram illustrating a ring modulator array according to a sixth embodiment; and FIG. 21 is a diagram illustrating a wavelength adjusting operations of the ring modulator array.

DESCRIPTION OF EMBODIMENTS

According to an aspect of the embodiments, it may be desirable to provide an optical semiconductor device capable of autonomously matching a resonant wavelength of the ring modulator and a wavelength of input light or a wavelength of a light source without a monitor light feedback mechanism.

In the following, preferred embodiments are described with reference to the accompanying drawings.

Figure 2A:
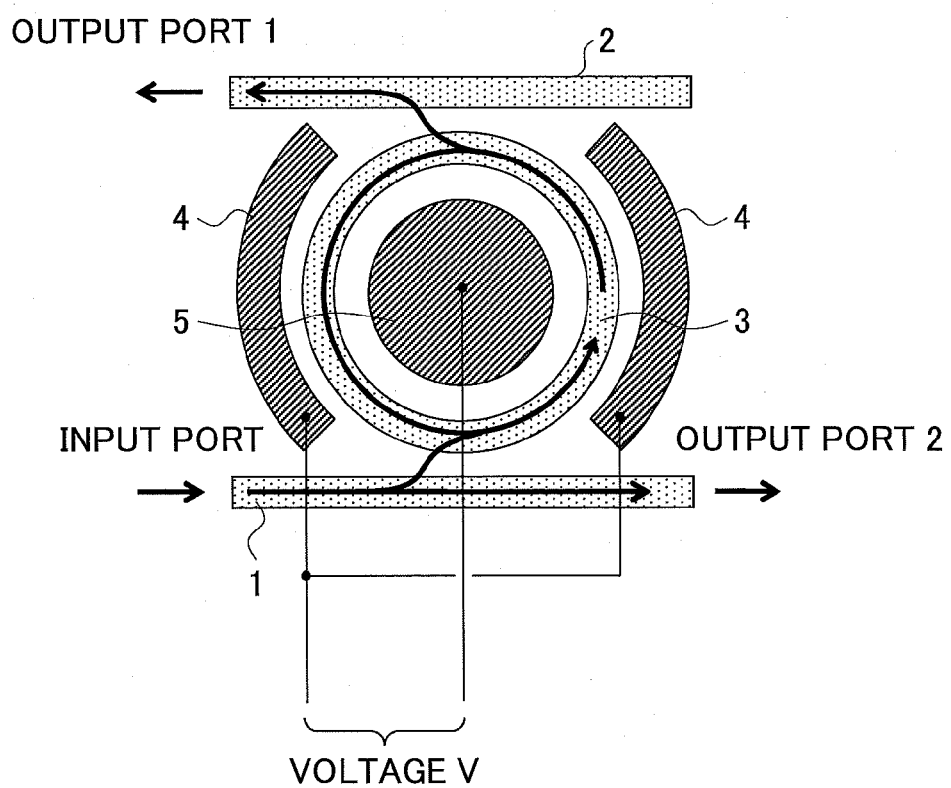
FIG. 2A is a diagram illustrating a basic configuration of a ring modulator.

Initially, an illustration is given, with reference to FIGS. 2A to 4, of general characteristics of a ring modulator. As illustrated in FIG. 2A, light input into an input port is led to an output port 1 when a wavelength of the input light matches a ring resonant wavelength. The ring resonant wavelength is determined based on a circumferential optical path length of a ring resonator 3. Note that the ring resonant wavelength is a fraction of an integer of the circumferential optical path length. When the wavelength of the input light shifts from the ring resonant wavelength, the input light is led to an output port 2. When the refractive index is changed by applying a voltage to the ring resonator 3 via the electrodes 4 and 5 to change the circumferential optical path length of the ring resonator 3, the ring resonant wavelength changes with the change of the circumferential optical path length of the ring resonator 3. Hence, the transmittance changes in view of a specific wavelength. This transmittance change is used in optical intensity modulation.

As indicated by arrows in FIG. 2B, when light having a predetermined wavelength is input into the input port, optical power output to the output port 1 is reduced by the applied voltage $V=V_{low}$, and is raised by the applied voltage $V=V_{high}$. Optical power output to the output port 2 obtains opposite results. Hence, the output port 1 and the output port 2 may produce signals having modulated optical intensities by changing the voltage between $V=V_{low}$ and $V=V_{high}$.

Figure 3A:
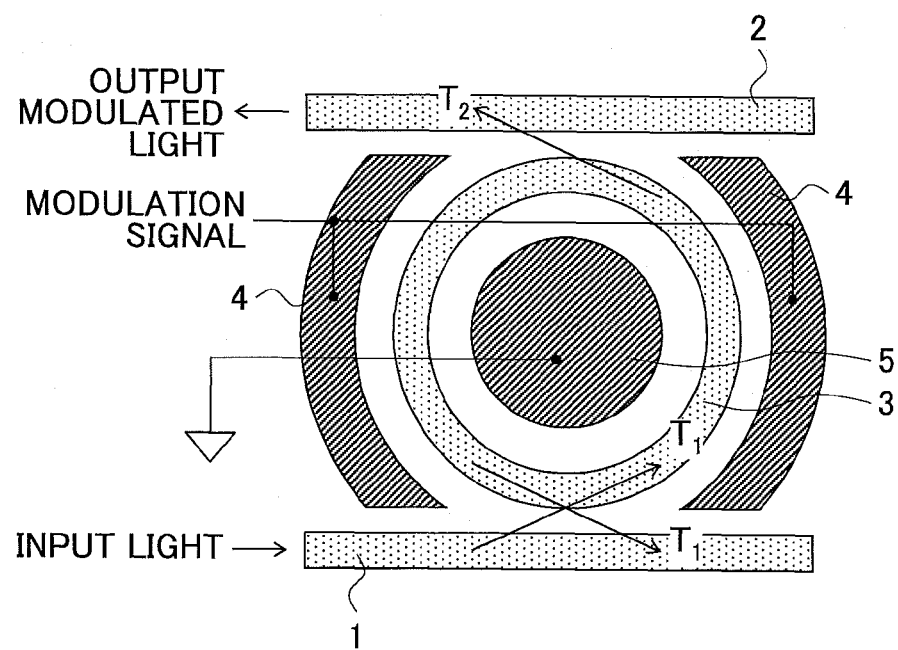
FIG. 3A is a diagram illustrating a definition of transmittance between waveguides and a ring of the ring modulator.

In such a modulator, there is a trade-off relationship between the wavelength band and the modulation efficiency. When $T_1$ is defined as transmittance of optical power between a waveguide 1 and the ring resonator 3 and $T_2$ is defined as transmittance of optical power between a waveguide 2 and the ring resonator 3 as illustrated in FIG. 3A, the smaller the values $T_1$ and $T_2$ are, the harder it is for the light input into the ring to be output as illustrated in FIG. 3B. As a result, the resonance is enhanced. Hence, the transmittance close to resonant wavelength exhibits a significant change, and the transmittance change obtained by changing the resonant wavelength by the application of the voltage, namely, a modulation efficiency, is raised (an upper diagram in FIG. 3B). On the other hand, the wavelength of the input light and the resonant wavelength may need to be matched with higher accuracy.

As illustrated in an ideal state (B) of FIG. 4, when the resonant wavelength is changed with a voltage change between $V_{low}$ and $V_{high}$, and the resonant wavelength matches the wavelength of the input light at one of the voltage values (e.g., $V_{high}$), the highest modulation efficiency may be obtained. On the other hand, in an initial state (A), the resonant wavelength does not necessarily match the wavelength of the input light due to an effect of fabrication variability or a temperature change.

A ring resonator is frequently made of materials having a positive temperature coefficient of the refractive index. Hence, the resonant wavelength is shifted to a longer wavelength by raising a temperature of the ring resonator 3. Thus, the ring resonator 3 is made such that the resonant wavelength at $V_{high}$ in the initial state is shorter than the wavelength of the input light, and the ring resonator in an operating state is heated such that the resonant wavelength at $V_{high}$ is shifted to the longer wavelength. As a result, the resonant wavelength is configured to match the wavelength of the input light (an ideal state (B)).

The present embodiment may provide a configuration of an optical semiconductor device in which the ring resonant wavelength is caused to match the wavelength of the input light during modulating operations without having a heater. Specifically, the configuration includes a serpentine waveguide that is optically connected to a ring waveguide and surrounds at least a part of the ring waveguide in a serpentine form. Hence, the serpentine waveguide in this configuration may have absorptance with respect to guided light. When light having a wavelength close to the resonant wavelength of the ring resonator is input, a part of the light is guided to the serpentine waveguide where heat is generated by absorbing the guided part of light. Thus, by disposing the serpentine waveguide in the periphery of the ring waveguide, it may be possible to raise the temperature of the ring waveguide itself by utilizing the generated heat of the serpentine waveguide.

An illustration is given of a specific configuration to implement the above-described configuration.

First Embodiment

Figure 5:
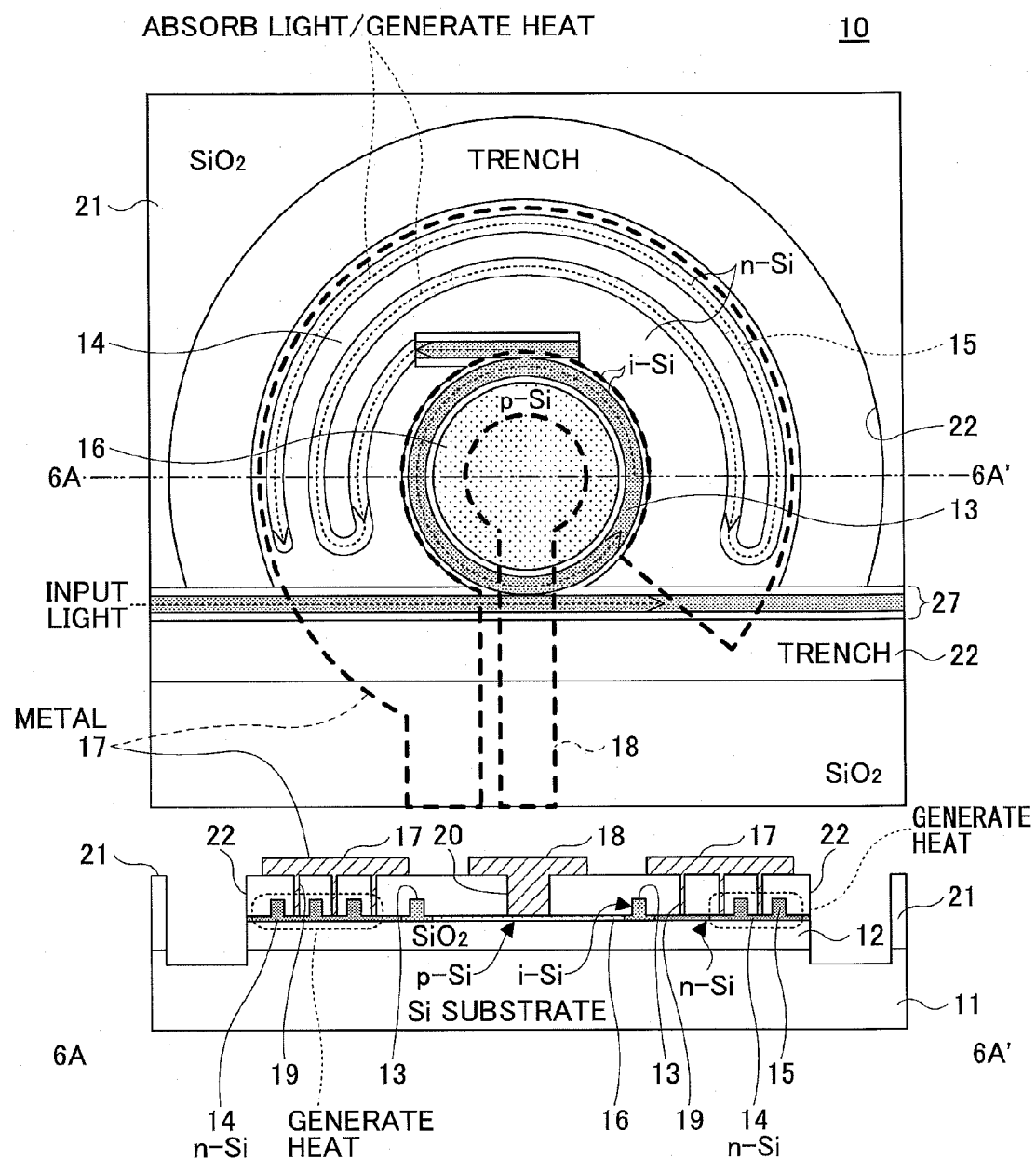
FIG. 5 is a configuration diagram illustrating a ring modulator according to a first embodiment.

FIG. 5 is a schematic diagram of a ring modulator 10 as an example of an optical semiconductor device according to a first embodiment, and FIG. 6 is a cross-sectional diagram cut along 6A-6A' of FIG. 5. The ring modulator 10 is formed on a $SiO_2$ film 12 on a silicon substrate 11. The ring modulator 10 includes a ring waveguide 13, and a serpentine waveguide 15 configured to be optically connected to the ring waveguide 13, and to surround at least a part of the ring waveguide 13 in a serpentine form. The serpentine waveguide 15 is made of a material having absorptance with respect to guided light. In the example of FIG. 5, the serpentine waveguide 15 is heavily doped with n-type impurity ions having greater optical absorption coefficients with respect to the guided light.

The ring modulator 10 includes a linear waveguide 27 optically coupled with the ring waveguide 13. Core areas of the ring waveguide 13 and the linear waveguide 27 are made of an intrinsic semiconductor (i-Si). A lower $SiO_2$ film 12 and an upper $SiO_2$ film 21 serve as cladding. An n-type semiconductor (n-Si) layer 14 is disposed outside the ring waveguide 13, and a p-type semiconductor (p-Si) layer 16 is disposed inside the ring waveguide 13. A trench 22 is formed in the periphery of the n-type semiconductor layer 14 and the linear waveguide 27.

The n-type semiconductor layer 14 is connected to an electrode 17 via a contact-via 19. The p-type semiconductor layer 16 is connected to an electrode 18 via a contact-via 20. Refractive-index modulation is performed by the application of a voltage to an interval between the electrodes 17 and 18.

The ring waveguide 13 serves as a ring resonator. When the ring modulator 10 receives light having a wavelength close to the ring resonant wavelength, the received light (i.e., light) circulates in the ring waveguide 13. In this case, a part of the input light is guided from the ring waveguide 13 to the serpentine waveguide 15 (see an arrow in FIG. 5). The serpentine waveguide 15 is heavily doped with n-type impurities, and heat is generated by absorbing light along with the propagation of light. The serpentine waveguide 15 has a serpentine form having a length sufficiently long to absorb light.

Figure 7A:
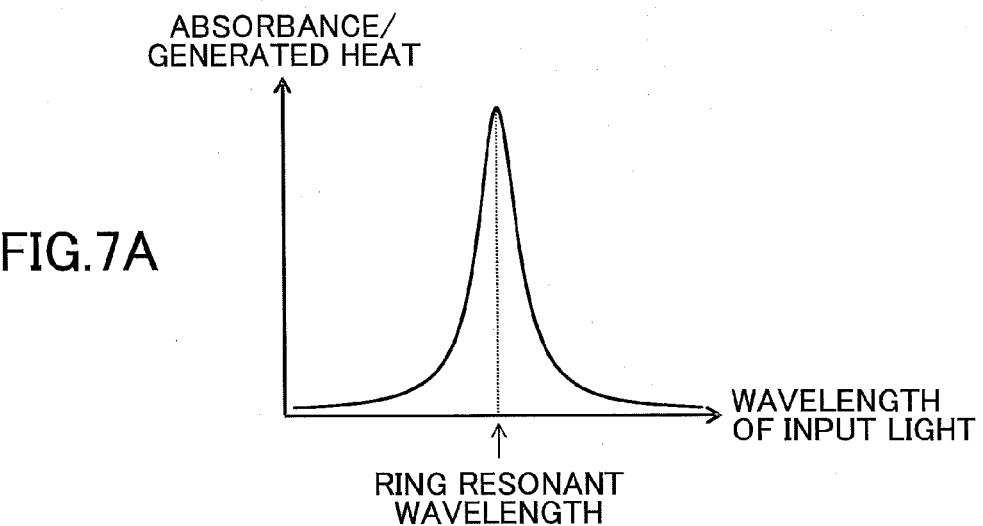
FIGS. 7A and 7B are diagrams illustrating a wavelength of input light of the ring modulator that matches a ring resonant wavelength.
Figure 7B:
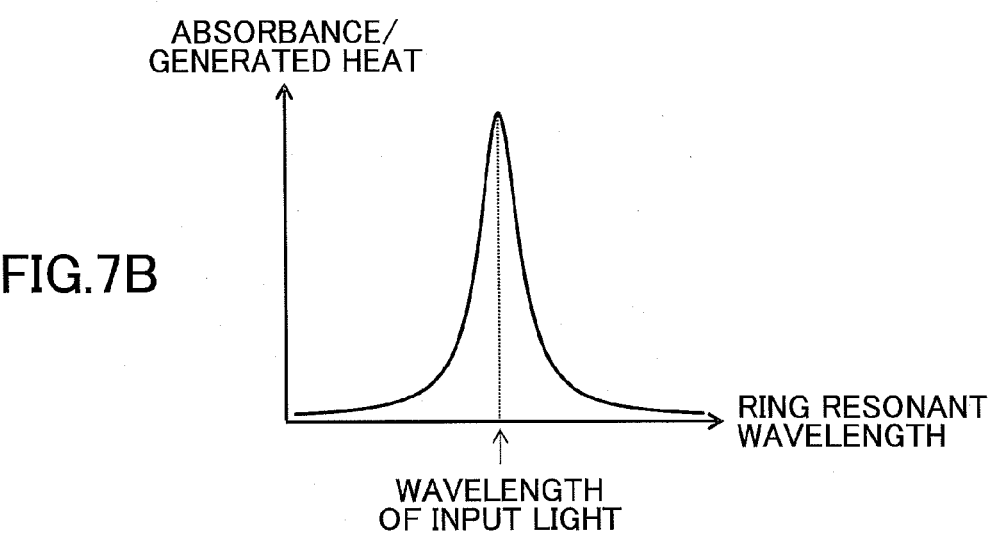

As illustrated in FIG. 6, heat generated in the serpentine waveguide 15 is propagated to the adjacent ring waveguide 13, and the propagated heat raises the temperature of the ring waveguide 13. As illustrated in FIG. 7, the absorptance and generated heat reach the respective maximum values when the wavelength of the input light matches the ring resonant wavelength.

It may be easy to make the configuration of FIGS. 5 and 6 because the serpentine waveguide 15 is formed by utilizing an impurity-doped area of a PN junction of the ring modulator 10. Note that a dopant impurity in the serpentine waveguide 15 is not necessarily the same as a dopant impurity in the n-type semiconductor layer 14. Impurity differing from the dopant impurity in the n-type semiconductor layer 14 may be used as a dopant in the serpentine waveguide 15. Further, in FIG. 5, the core area of the ring waveguide 13 is i-Si. However, when modulation is applied based on the voltage, the core area may be p-Si or n-Si, or the core area may include a junction of p-Si and n-Si.

Next, an illustration is given of, with reference to FIGS. 8 to 12, a resonant wavelength control method for the ring modulator 10 that employs the serpentine waveguide 15. When the temperature of the ring waveguide 13 is raised by externally generated heat conduction, the refractive index of the ring waveguide 13 rises to shift the ring resonant wavelength toward a longer wavelength. There is a relationship indicated by a straight-line in FIG. 8 between the generated heat (generated amount of heat) and the ring resonant wavelength. On the other hand, there is heat generated by the absorption of light guided from the ring waveguide 13 to the serpentine waveguide 15. There is a relationship indicated by a curved-line in FIG. 8 between the generated heat (amount of heat) of the serpentine waveguide 15 and the ring resonant wavelength.

Hence, ring generated heat (generated amount of heat) of the ring modulator 10 and the ring resonant wavelength are stabilized at one of nodes 1, 2, and 3 that satisfy the straight-line relationship derived from the external heat, and the curve-line relationship derived from the heat generated by the serpentine waveguide 15.

Of the three nodes 1, 2, and 3, the node 2 is an unstable point. For example, when the ring resonant wavelength is shifted toward a wavelength longer than the wavelength at the node 2, the heat generated by the absorption of resonant light is increased to acquire a positive feedback to further elongate the ring resonant wavelength. Hence, the ring resonant wavelength is finally stabilized at the node 3. On the other hand, when the ring resonant wavelength is shifted toward a wavelength shorter than the wavelength at the node 2, the heat generated by the absorption of resonant light is decreased to acquire a positive feedback to further shorten the ring resonant wavelength. Hence, the ring resonant wavelength is finally stabilized at the node 1. In view of peripheral wavelengths around the node 2 as well as including a wider wavelength range, when the ring resonant wavelength is longer than the wavelength at the node 2 serving as a boundary, the ring resonant wavelength is stabilized at the node 3. On the other hand, when the ring resonant wavelength is shorter than the wavelength at the node 2, the ring resonant wavelength is stabilized at the node 1 (see directions of arrows in the straight-line in FIG. 8).

In this configuration, it may be useful to shift the temperature of the ring modulator 10 toward a temperature obtained at a wavelength longer than the wavelength at the node 2 at the start of operations. The detailed illustration is given below with reference to FIGS. 9A, 9B, and 9C.

As illustrated in FIG. 9A, no light is input into the ring modulator 10 such that no heat is generated in the serpentine waveguide 15 in an initial state. Hence, the ring resonant wavelength is in the initial state illustrated as a bullet in FIG. 9A. As illustrated in FIG. 9B, the ring resonant wavelength is forced to be shifted to a point of a bullet that indicates a wavelength longer than the wavelength at the node 2 by switching a heater on. Thereafter, the ring resonant wavelength is stabilized at the node 3 by switching the heater off as illustrated in FIG. 9C. When the ring resonant wavelength is in a stabilized state, the heater does not need to be operated, and no power is consumed. Further, once the ring resonant wavelength is locked to a stabilized point, the stabilized ring resonant wavelength continues to be locked automatically. Hence, no feedback control is required for the monitor or the heater.

The above stabilized point indicates a wavelength suitable for applying on/off modulation with respect to input light subject to modulation. The detailed illustration is given below with reference to FIG. 10. As illustrated in FIG. 10, the ring modulator 10 implements modulation by varying the voltage between $V_{low}$ and $V_{high}$ to shift the ring resonant wavelength. The ring resonant wavelength when the modulation is implemented is not uniquely determined. However, the ring resonant wavelength when the modulation voltage is $V_{low}$ is described as an example below for the purpose of illustration.

Figure 11:
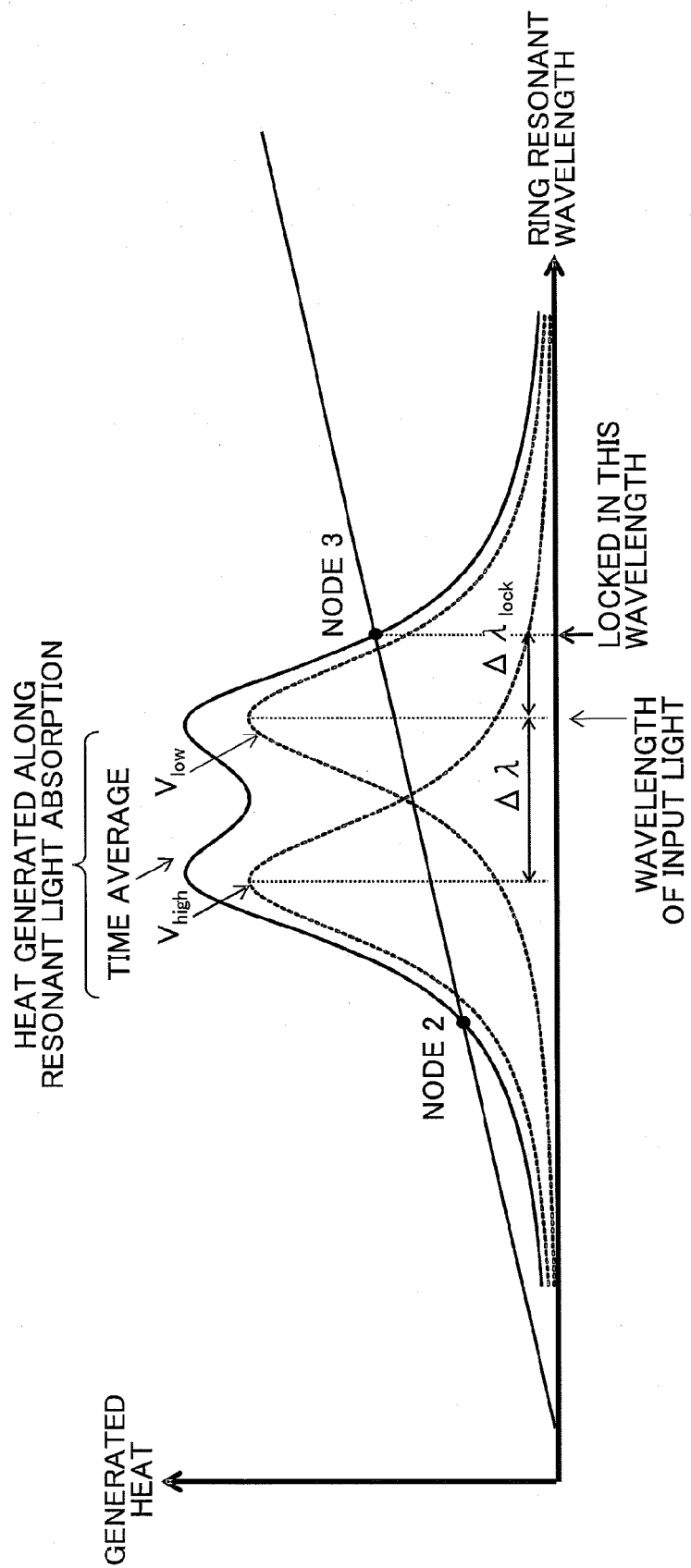
FIG. 11 is a diagram illustrating a shifting operation and a locking operation for the resonant wavelength during modulation.

FIG. 11 illustrates heat (generated amount of heat) generated by the absorption of resonant light when the ring modulator 10 applies modulation. As illustrated in FIG. 11, dotted curved lines indicate change in generated amounts of heat between the voltages $V_{low}$ and $V_{high}$. The temperature change is relatively slow compared to the switching the voltage between the voltages $V_{low}$ and $V_{high}$. Hence, a solid curved line obtained by time-averaging the two dotted curved lines is considered to indicate the amount of heat generated from the ring modulator 10 by the absorption of the resonant light.

Figure 8:
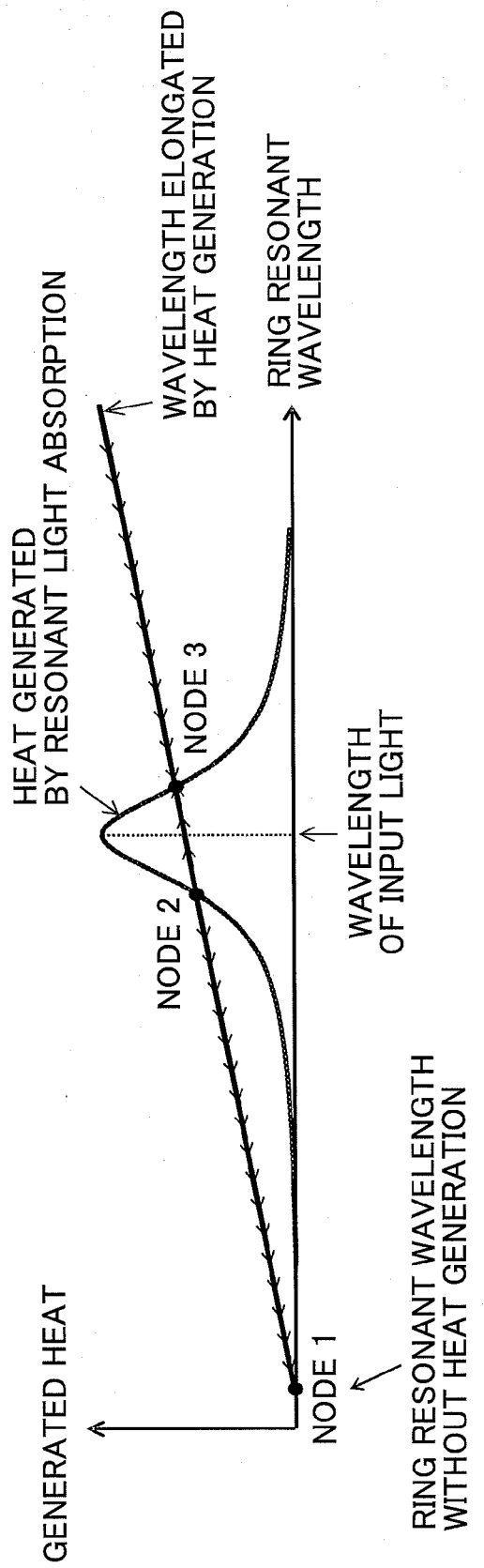
FIG. 8 is a diagram illustrating a relationship between the ring resonant wavelength and a generated heat and stabilized points.

To apply modulation, the heater is switched off to stabilize the ring resonant wavelength at the node 3 after the ring resonant wavelength is shifted toward a wavelength longer than the wavelength at the node 2 by using a heater, similar to the case illustrated in FIG. 8. In this case, the wavelength of the input light is located at a position indicated by a "continuous-wave (CW) optical wavelength" of FIG. 10 with respect to a transmission spectrum. It is clear that the resonant wavelength is locked to the wavelength of the input light where modulation may be applied between the two points indicated by bullets of FIG. 10.

Figure 12:
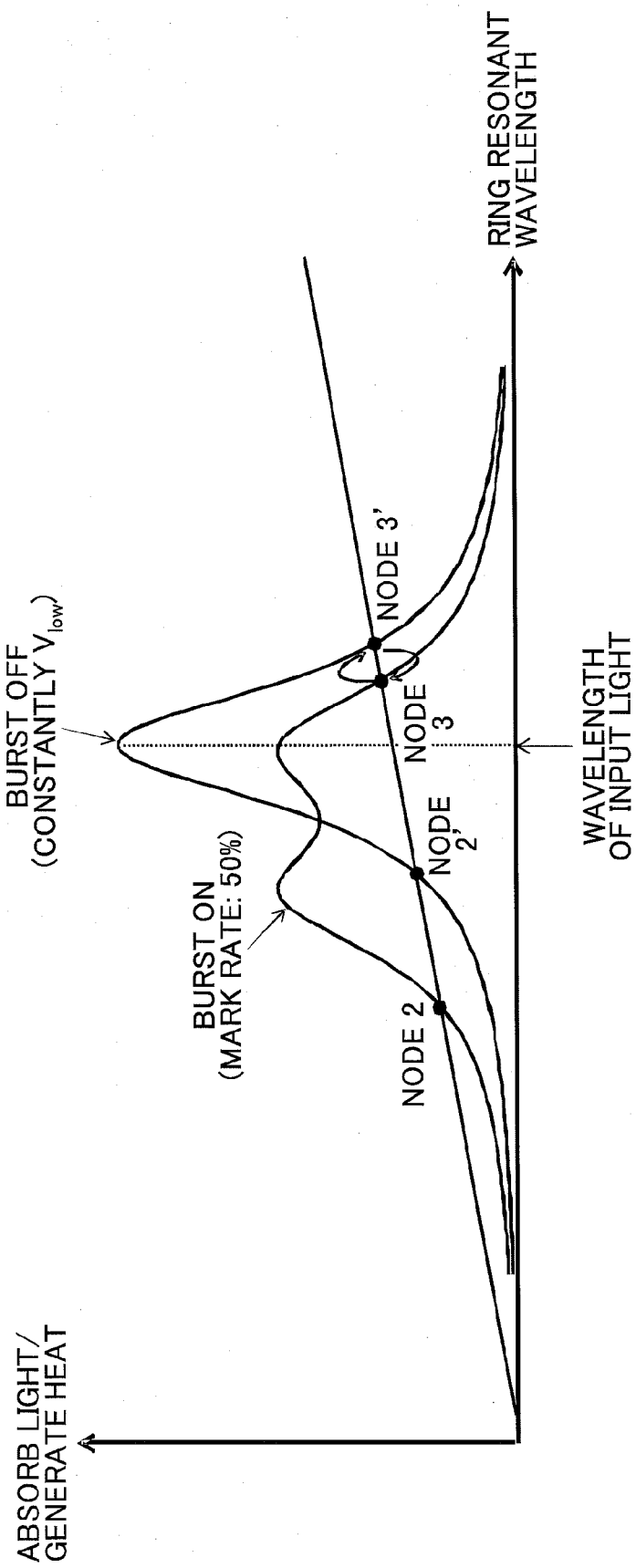
FIG. 12 is a diagram illustrating a shifting operation and a locking operation for the resonant wavelength during burst signal modulation.

FIG. 12 illustrates operations with respect to a combination (mixture) of burst signals in a burst-on status and those in a burst-off status. The ring resonant wavelength may continuously be locked to the wavelength of the input light (i.e., light subject to modulation) with respect to the combination of the burst signals to which the voltage $V_{low}$ is constantly applied (a burst-on status) and the burst signals to which the voltage randomly switching between $V_{low}$ and $V_{high}$ is applied (a burst-off status). FIG. 12 illustrates an example of the burst-on status exhibiting a mark rate of 50%.

Nodes indicating intersections of a curved-line of the generated heat in the burst-off status and the straight line differ from nodes indicating intersections of a curved-line of the generated heat in the burst-on status and the straight line. Hence, nodes in the burst-off status corresponding to the nodes 2 and 3 in the burst-on status are denoted as nodes 2' and 3'. When the ring resonant wavelength that is locked to the node 3 in the burst-on status (the same status as illustrated in FIG. 11) is switched to the burst-off status, the ring resonant wavelength becomes not stable at the node 3. However, the node 3 is located at a position where a wavelength is longer than the wavelength at the node 2'. Hence, the ring resonant wavelength is finally stabilized at the node 3'. When the ring resonant wavelength that is stable at the node 3' is switched to the burst-on status, the ring resonant wavelength becomes unstable at the node 3'. However, the node 3' is located at a position where a wavelength is longer than the wavelength at the node 2. Hence, the ring resonant wavelength is stabilized at the node 3. Thus, the ring resonant wavelength transitions between the nodes 3 and 3' when the burst-on status and the burst-off status are switched. The locked status will not be disengaged (unlocked) due to this transition. When the burst-off status is switched to the burst-on status, the ring resonant wavelength is allowed to be returned to the node 3.

Figure 13:
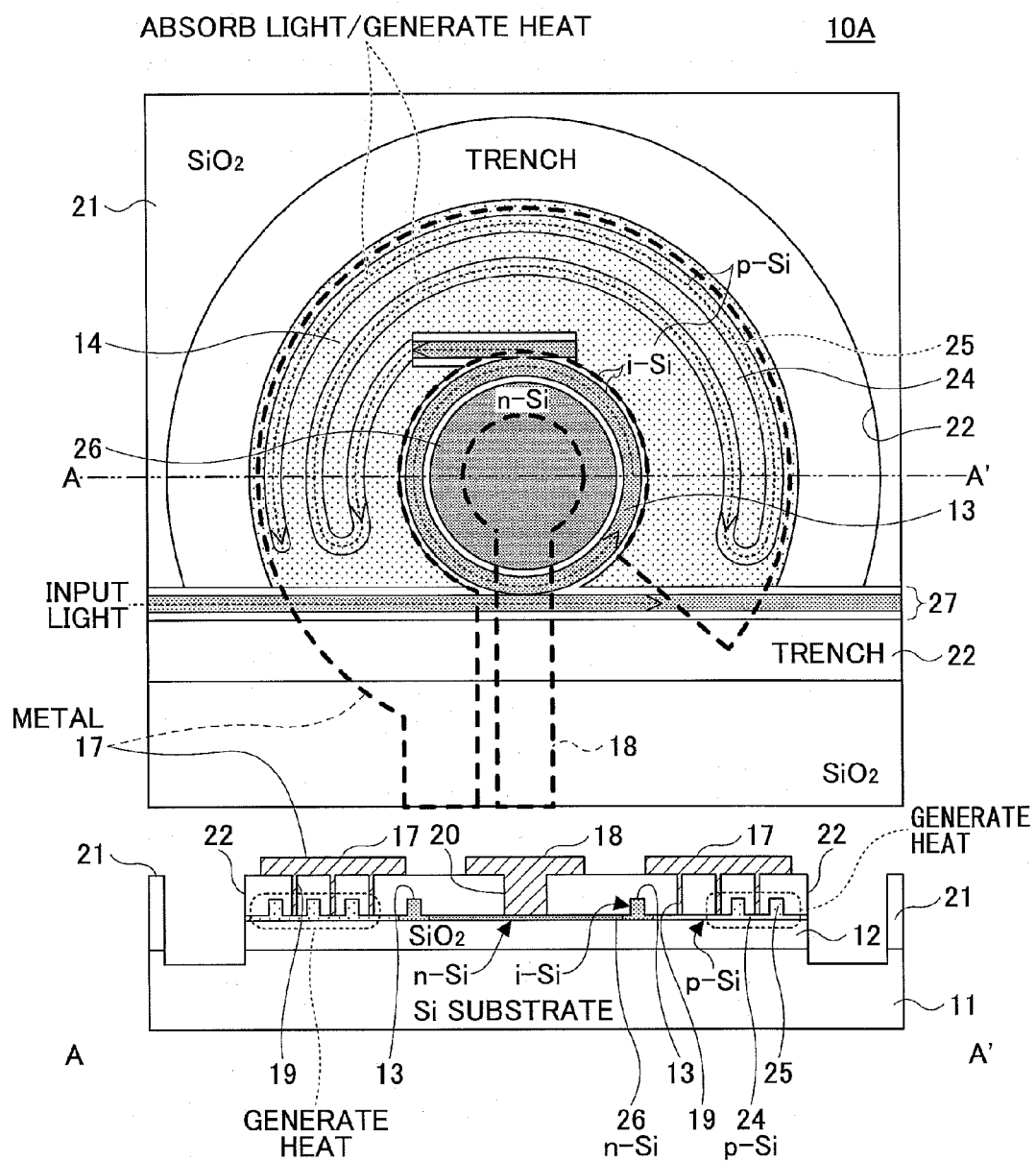
FIG. 13 is a diagram illustrating modification of the ring modulator according to the first embodiment.

FIG. 13 illustrates a ring modulator (an optical semiconductor device) 10A as modification of FIG. 5. In FIG. 13, locations of a p-type semiconductor area and an n-type semiconductor area are reversed from those of the configuration illustrated in FIG. 5. That is, a p-type semiconductor layer 14 is situated outside the ring waveguide 13. A p-type impurity doped serpentine waveguide 25 is formed to surround the ring waveguide 13 on the p-type semiconductor layer 14. An n-type semiconductor area 26 is situated inside the ring waveguide 13. An electrode 17 is electrically connected to a p-type semiconductor layer 24, and an electrode 18 is electrically connected to the n-type semiconductor layer 26.

In this configuration, when the ring waveguide 13 receives light having a wavelength close to the resonant wavelength, a part of the resonant light is led to the serpentine waveguide 25, where the lead part of the resonant light is absorbed by the dopant impurities to generate heat. The generated heat in the serpentine waveguide heats the ring waveguide 13 to match the ring resonant wavelength and the wavelength of the input light (i.e., light subject to modulation).

Second Embodiment

Figure 14:
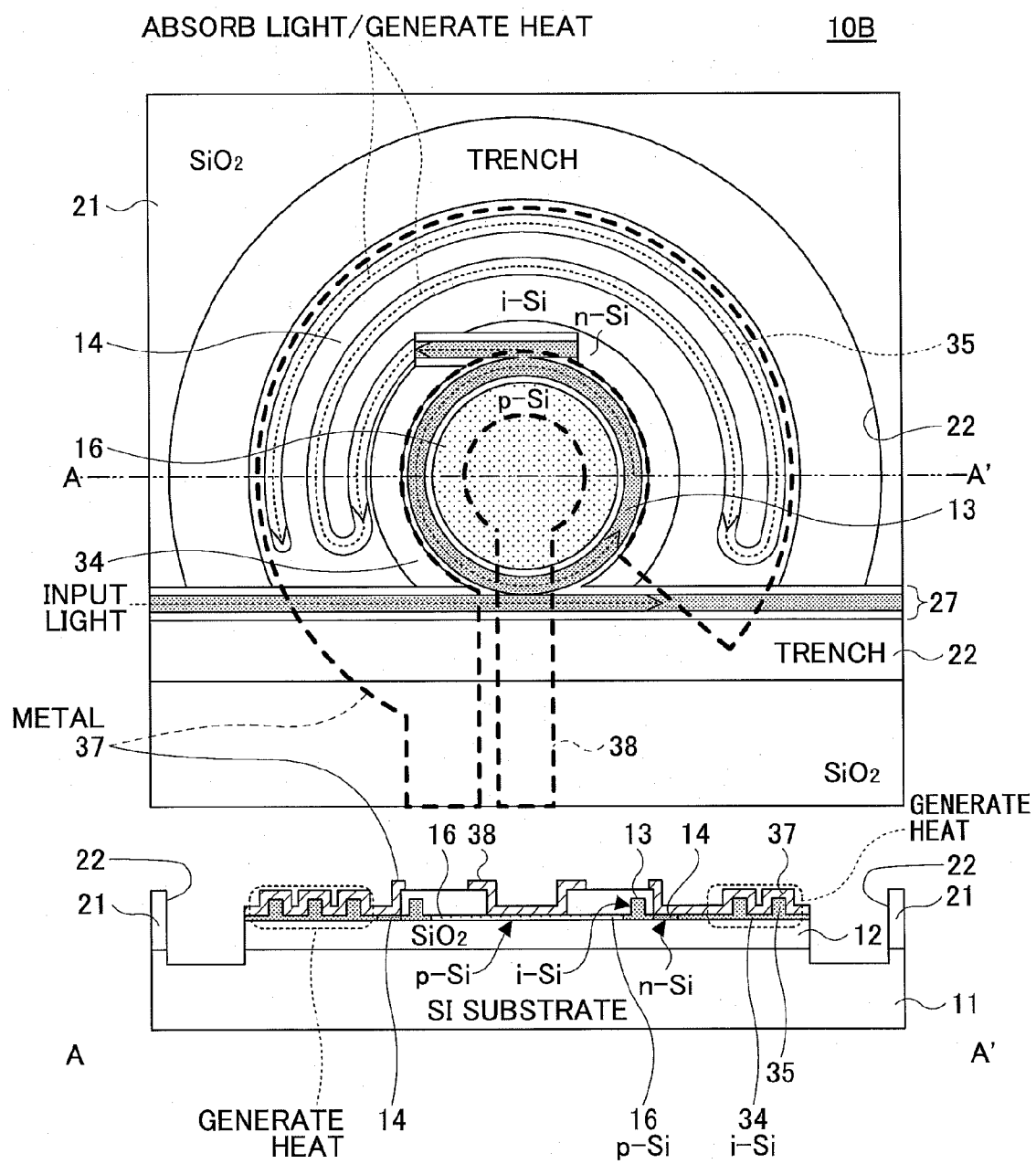
FIG. 14 is a diagram illustrating a configuration of a ring modulator according to a second embodiment.

FIG. 14 illustrates a ring modulator 10B according to a second embodiment. The ring modulator 10B has a serpentine waveguide 35. The serpentine waveguide 35 is formed by covering a core area of an intrinsic semiconductor (i-Si) with a metallic film 37. The metallic film 37 serves as an upper coating film of the serpentine waveguide 35 to absorb light as well as serving as a modulation electrode. Hence, the metallic film 37 also covers an n-type semiconductor 14 adjacent to a p-type semiconductor layer 16 inside the ring waveguide 13. The p-type semiconductor layer 16 inside the ring waveguide 13 is covered with a metallic film 38.

In this configuration, the metallic film 37 of the serpentine waveguide 35 may be used as a modulation electrode. Thus, an electrode pattern may be enlarged to facilitate electrode fabrication. In this configuration, even though the locations of the n-type-semiconductor layer and the p-type semiconductor layer are reversed, similar advantageous effects may still be obtained.

Third Embodiment

Figure 15:
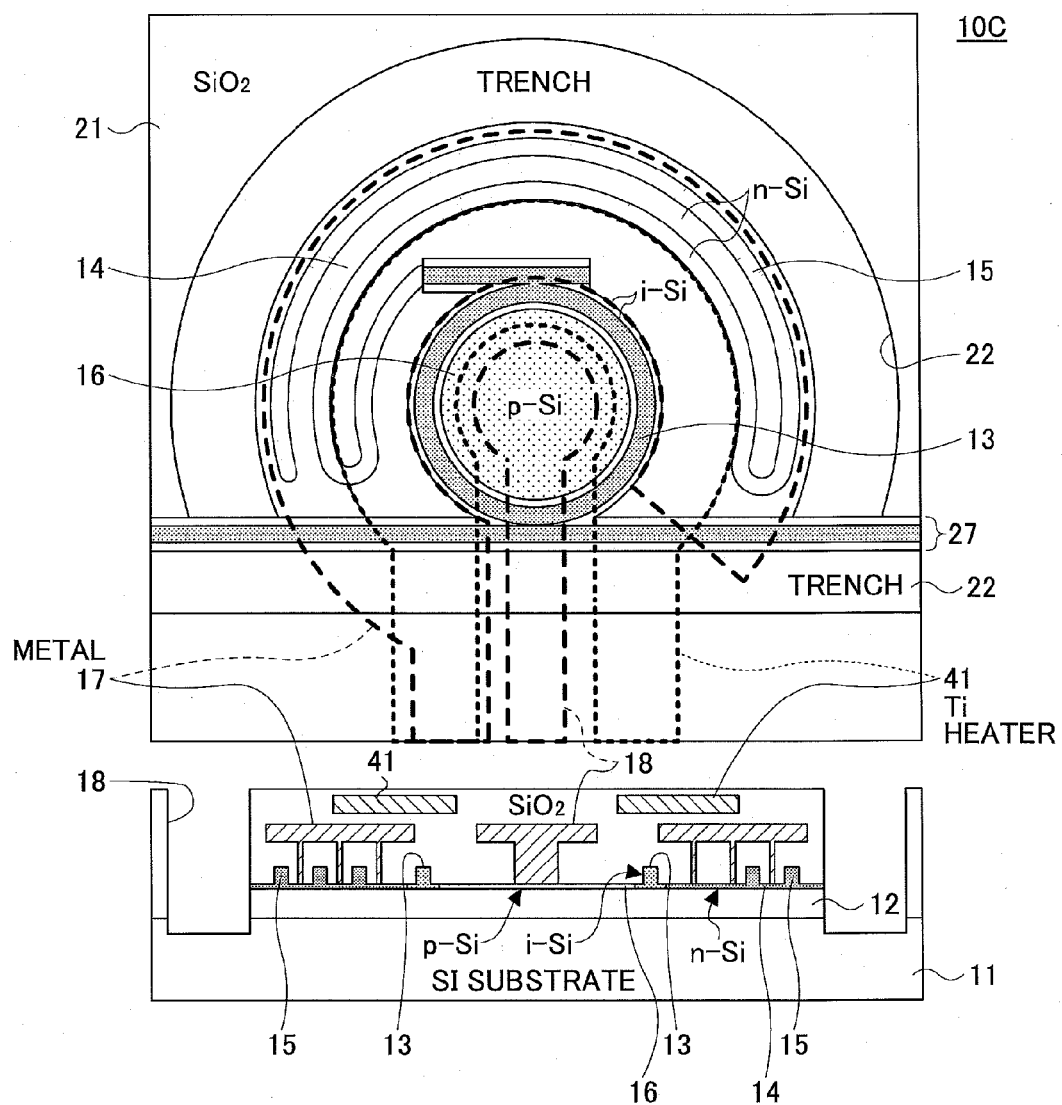
FIG. 15 is a diagram illustrating a configuration of a ring modulator according to a third embodiment.

FIG. 15 illustrates a ring modulator 10C according to a third embodiment. The ring modulator 10C has a heater 41 configured to heat a ring resonator (i.e., a ring waveguide) 13. The heater 41 is formed by forming, for example, a titanium (Ti) thin film above the ring waveguide 13 and fabricating the Ti film in a predetermined shape. The heater 41 may be activated by receiving the applied current via the electrode to generate Joule heat. To form the heater 41, tungsten (W), platinum (Pt), or impurity-doped silicon (Si) may be employed other than Ti. However, the materials to form the heater 41 are not limited to above examples insofar as materials may be able to form high-resistance films.

Fourth Embodiment

Figure 16:
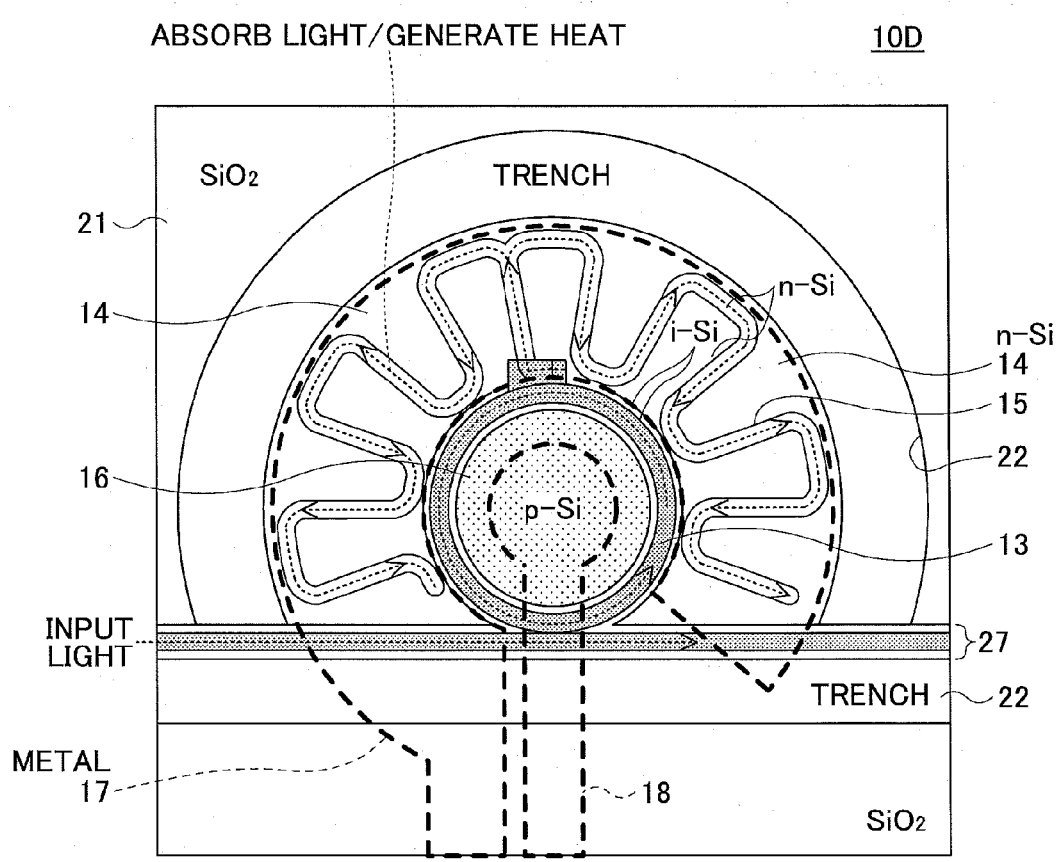
FIG. 16 is a diagram illustrating a configuration of a ring modulator according to a fourth embodiment.
Figure 17:
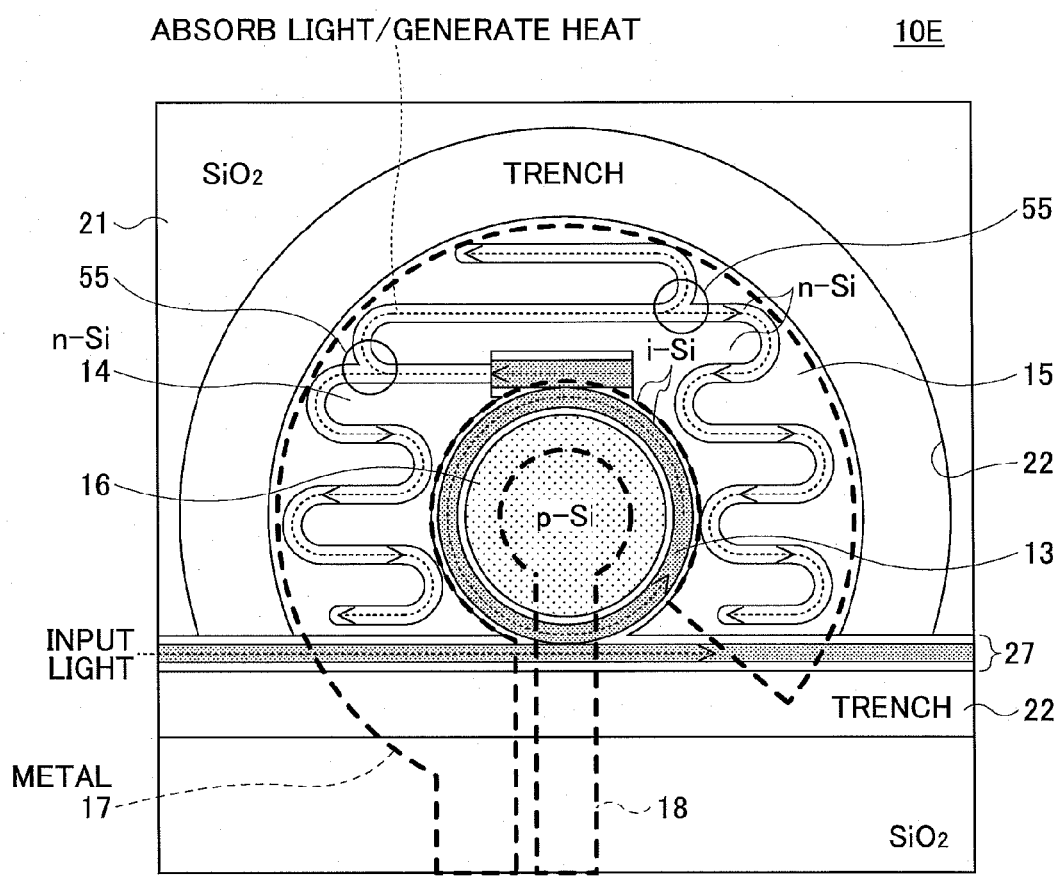
FIG. 17 is a diagram illustrating modification of the ring modulator according to the fourth embodiment.
Figure 18:
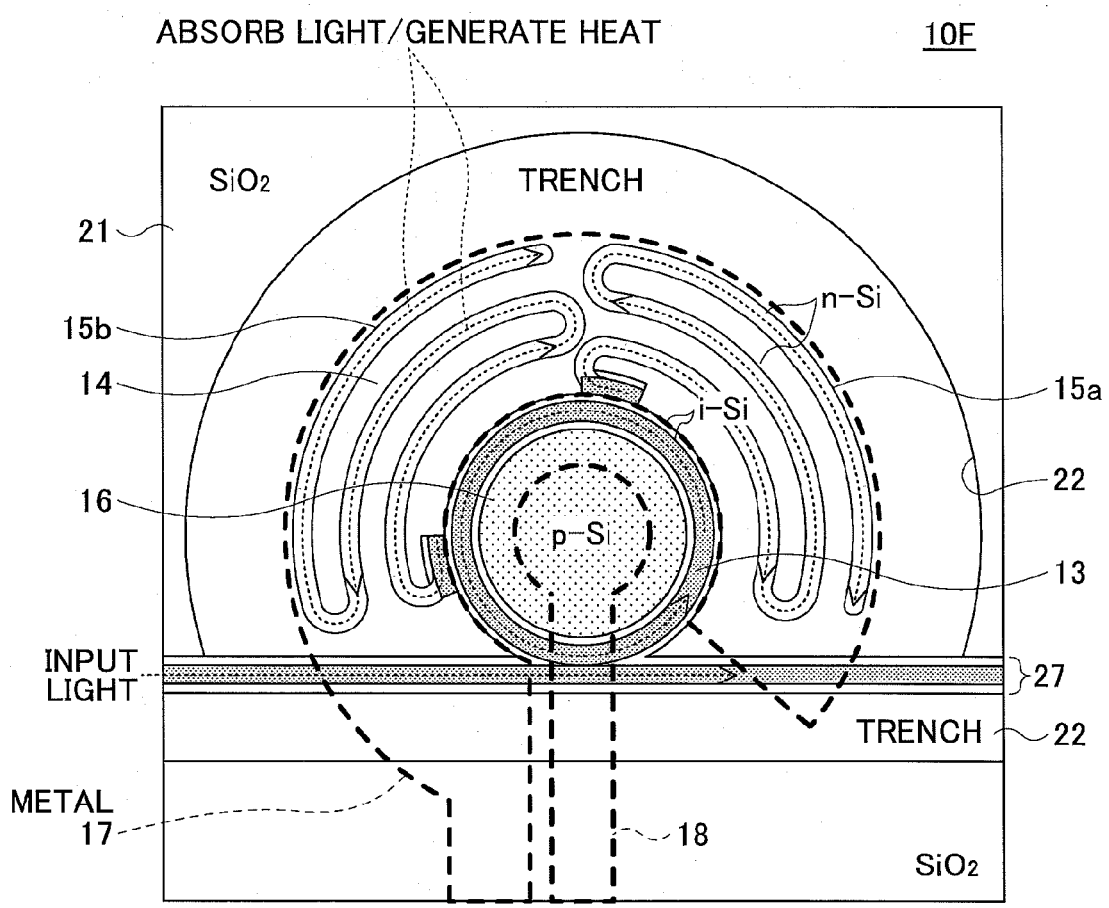
FIG. 18 is a diagram illustrating another modification of the ring modulator according to the fourth embodiment.

FIGS. 16 to 18 illustrate configuration examples of a ring modulator 10D according to a fourth embodiment. In FIG. 16, the ring modulator 10D is configured to include the serpentine waveguide 15 that radially extends from the center of the ring modulator 10D. In this configuration, the arrangement of the serpentine waveguide 15 may be any arrangement insofar as the serpentine waveguide 15 is sufficiently long to generate heat so as to raise the temperature of the ring waveguide 13 efficiently.

FIG. 17 illustrates modification of the fourth embodiment. In this configuration, a ring modulator 10E includes the serpentine waveguide 15 that has branches 55. Providing the branches 55 in the serpentine waveguide 15 may increase the number of configurations that allow the greater heat-generating area of the serpentine waveguide 15 to be disposed close to the ring waveguide 13.

FIG. 18 illustrates another modification of the fourth embodiment. In this configuration, a ring modulator 10F includes serpentine waveguides 15a and 15b. It may be possible that the amount of generated heat from the serpentine waveguide 15 decreases as light propagates along an optical propagation direction. Hence, providing the plural serpentine waveguides 15a and 15b facilitates disposing the greater heat-generating area close to the ring waveguide 13. Hence, this configuration may improve a temperature rise efficiency of the ring waveguide 13.

Fifth Embodiment

Figure 19A:
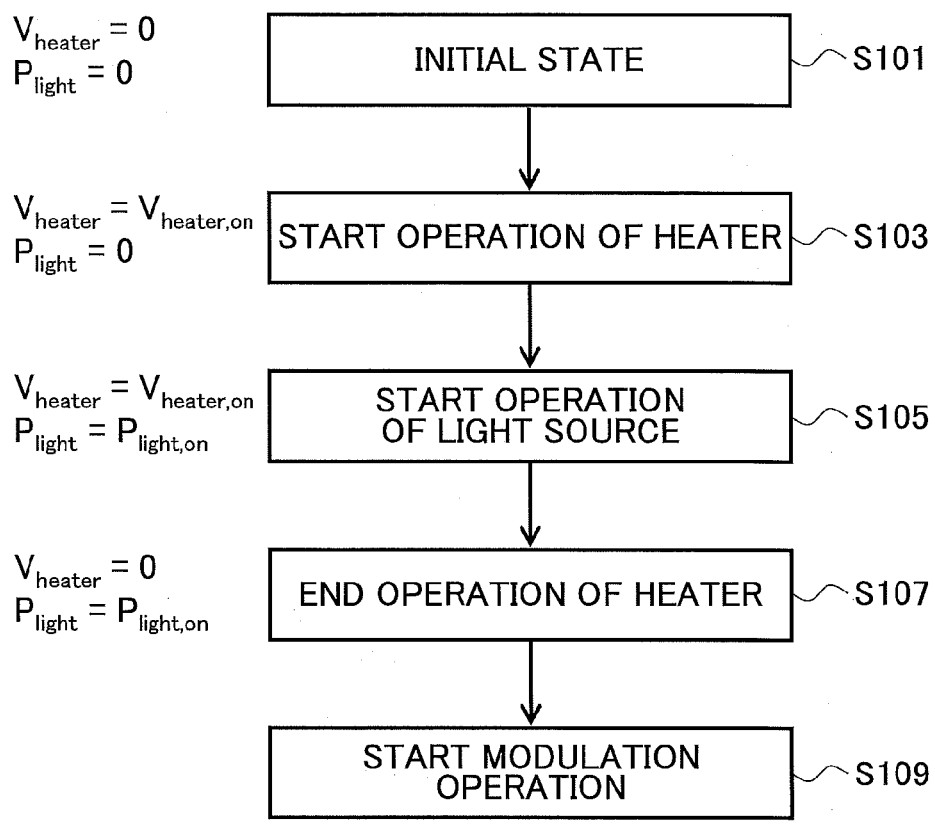
FIG. 19A is a diagram illustrating a first control flow according to a fifth embodiment.
Figure 19B:
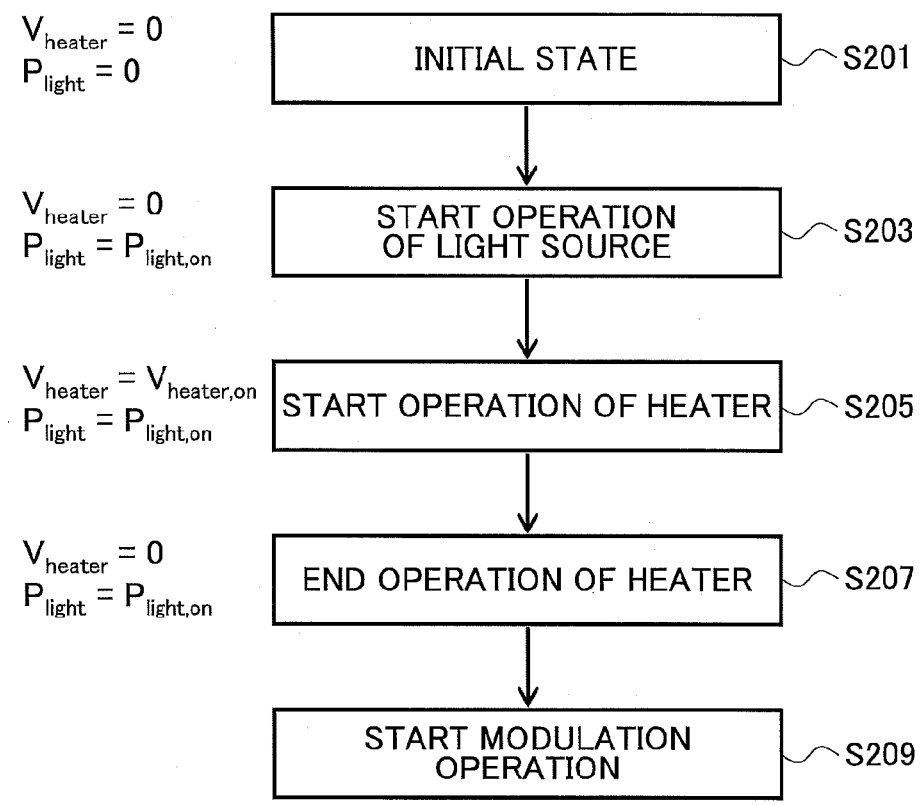
FIG. 19B is a diagram illustrating a second control flow according to the fifth embodiment.

FIGS. 19A and 19B illustrate control flows, each illustrating a process in which light subject to modulation (i.e., input light) is locked to the ring resonant wavelength of the ring modulator 10. As illustrated in FIG. 19A, step S101 indicates an initial state of the ring modulator 10. In the initial state, the voltage ($V_{heater}$) applied to the heater and input light power ($P_{light}$) are both zero. In step S103, the operation of the heater starts, and in step S105, an operation of light source starts. In step S107, the operation of the heater ends, and in step S109, a modulation operation starts.

In FIG. 19B, after an initial state in S201, the operation of the light source starts in step S203, and the operation of the heater starts in S205. In step S107, the operation of the heater ends, and in step S109, a modulation operation starts.

In either of the control flows of FIGS. 19A and 19B, the wavelength is locked by switching off the heater after the operations of both the light source and the heater have started. The ring resonant wavelength in the initial state is set such that the ring resonant wavelength is shorter than the wavelength of the modulated light output from the light source. The ring resonant wavelength in the initial state varies with its fabrication accuracy or temperature. Hence, the ring resonant wavelength in the initial state is set such that the ring resonant wavelength is shorter than the wavelength of the modulated light even when the ring resonant wavelength has varied toward the longest wavelength in consideration of such variability. The heater voltage $V_{heater,on}$ in operation is set such that the ring resonant wavelength is longer than the wavelength of the modulated light even when the ring resonant wavelength has varied toward the shortest wavelength.

Based on the above-described control, it may be possible to transition to autonomous resonant wavelength control by temporarily raising the temperature of the ring modulator higher than the temperature at the node 3 of FIG. 8 prior to the modulation operation and subsequently switching the heater off.

Sixth Embodiment

FIG. 20 illustrates N ring modulators 10 according to the first embodiment that are connected in concatenation. Each of the ring modulators $10_1$ to $10_N$ has a ring resonator, and a serpentine waveguide having absorptance disposed adjacent to the corresponding ring resonator. The ring modulators $10_1$ to $10_N$ have different ring circumferential optical path lengths having different wavelengths $\lambda_{1'}, \lambda_{2'}, \ldots,$ and $\lambda_{N'}$ as resonant wavelengths. A multiwavelength light source 71 having oscillation light wavelengths $\lambda_1, \lambda_2, \ldots,$ and $\lambda_N$ is connected to an input part of the connected linear waveguides.

In an initial status (1) of FIG. 21, the respective light wavelengths $\lambda_1, \lambda_2, \ldots,$ and $\lambda_N$ of the multiwavelength light source 71 are designed to be longer than the resonant wavelengths $\lambda_{1'}, \lambda_{2'}, \ldots,$ and $\lambda_{N'}$ of the respective ring modulators $10_1$ to $10_N$ in the initial status.

In a heater on status (2) of FIG. 21, the resonant wavelengths $\lambda_{1'}, \lambda_{2'}, \ldots,$ and $\lambda_{N'}$ are designed to be longer than the respective wavelengths $\lambda_1, \lambda_2, \ldots,$ and $\lambda_N$ of the multiwavelength light source 71 when not-illustrated heaters of the ring modulators $10_1$ to $10_N$ are operated. The ring modulators $10_1$ to $10_N$ being configured as above perform control based on the flows illustrated in FIGS. 19A and 19B. In a heater off status (3) of FIG. 21, modulation may be applied by locking the resonant wavelengths $\lambda_{1'}, \lambda_{2'}, \ldots,$ and $\lambda_{N'}$ of the ring modulators $10_1$ to $10_N$ in respective wavelengths suitable for modulating the wavelengths $\lambda_1, \lambda_2, \ldots,$ and $\lambda_N$ of the light source (hereinafter also called "light source wavelengths $\lambda_1, \lambda_2, \ldots,$ and $\lambda_N$"). In the configuration of FIG. 20, the resonant wavelengths of the ring modulators $10_1$ to $10_N$ are set as being longer from the input side (the light source side) toward the output side. However, the order of the resonant wavelengths is not limited to this configuration. The resonant wavelengths may be arranged in any order. Further, the ring modulators 10 according to the second to the fourth embodiments may be connected in concatenation instead of connecting the ring modulators 10 according to the first embodiment in concatenation.

In FIG. 21, the voltages of the heaters to be applied are assumed such that the ring resonant wavelength intersects only one of the light source wavelengths when the heaters are operated. However, the voltages of the heaters to be applied may be set such that the ring resonant wavelength intersects two of the light source wavelengths when the heaters are operated.

In the configuration of the embodiment described above, the wavelength shift between the input light and the ring resonators may be allowed (covered) in a broader wavelength range even in the ring modulators exhibiting high resonance and high modulation efficiency. In addition, since the electric power of the heaters that are mostly required for the modulation operation is not required, it may be possible to provide a significant effect on reduction of the electric power consumption. Further, since the monitor PD or the feedback control circuit may be omitted from the configuration of the ring modulator, it may be possible to reduce the size and the cost of the ring modulator.

According to the configurations described above, the resonant wavelength of the ring modulator may autonomously match the wavelength of the light source or the wavelength of the input light.

The configurations described above may be applied to the technical field of optical communications including optical modulation using a ring resonator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An optical semiconductor device comprising:
a ring waveguide; and
a serpentine waveguide configured to be optically connected to the ring waveguide and surround at least a part of the ring waveguide in a serpentine form, wherein
the serpentine waveguide heats the ring waveguide by absorbing input light propagated from the ring waveguide to the serpentine waveguide.

2. The optical semiconductor device as claimed in claim 1, wherein
the serpentine waveguide is an impurity-doped waveguide.

3. The optical semiconductor device as claimed in claim 2, further comprising:
a first conductivity type semiconductor layer configured to reside outside the ring waveguide; and
a second conductivity type semiconductor layer configured to reside inside the ring waveguide, wherein
the serpentine waveguide is formed on the first conductivity type semiconductor layer.

4. The optical semiconductor device as claimed in claim 3, further comprising:
a pair of electrodes each connected to a corresponding one of the first conductivity type semiconductor layer and the second conductivity type semiconductor layer.

5. The optical semiconductor device as claimed in claim 1, wherein
the serpentine waveguide is a silicon waveguide which is not doped with impurities, and the silicon waveguide is covered with a first metallic film.

6. The optical semiconductor device as claimed in claim 5, further comprising:

a first conductivity type semiconductor layer residing between the serpentine waveguide and the ring waveguide, wherein the first metallic film covers the first conductivity type semiconductor layer as well as covering the silicon waveguide.

7. The optical semiconductor device as claimed in claim 6, further comprising:

a second conductivity type semiconductor layer configured to reside inside the ring waveguide; and a second metallic film configured to cover the second conductivity type semiconductor layer.

8. The optical semiconductor device as claimed in claim 1, further comprising:

a heater configured to heat the ring waveguide.

9. An optical semiconductor device comprising:

a ring waveguide; and a serpentine waveguide configured to be optically connected to the ring waveguide and surround at least a part of the ring waveguide in a serpentine form, wherein the serpentine waveguide has an absorption ability with respect to input light and is configured to heat the ring waveguide by absorbing the input light propagated from the ring waveguide to the serpentine waveguide.

10. An optical semiconductor device comprising:

a ring waveguide; and a serpentine waveguide configured to be optically connected to the ring waveguide and surround at least a part of the ring waveguide in a serpentine form, wherein the serpentine waveguide has an absorption ability with respect to input light and is configured to heat the ring waveguide by absorbing the input light propagated from the ring waveguide to the serpentine waveguide, and wherein the serpentine waveguide is an impurity-doped waveguide.

11. The optical semiconductor device as claimed in claim 10, further comprising:

a first conductivity type semiconductor layer configured to reside outside the ring waveguide; and a second conductivity type semiconductor layer configured to reside inside the ring waveguide, wherein the serpentine waveguide is formed on the first conductivity type semiconductor layer.

12. The optical semiconductor device as claimed in claim 11, further comprising:

a pair of electrodes each connected to a corresponding one of the first conductivity type semiconductor layer and the second conductivity type semiconductor layer.

\* \* \* \* \*